(12) United States Patent
Song et al.

(10) Patent No.: US 12,738,826 B2
(45) Date of Patent: Sep. 15, 2026

(54) STEPPING DIMMING MOTOR STRUCTURE WITH PUSH ROD AND WIRE BLOCK

(71) Applicant: NINGBO JINGHUA ELECTRONICS TECHNOLOGY CO., LTD., Ningbo (CN)

(72) Inventors: Yuanjie Song, Ningbo (CN); Jiaer Zhang, Ningbo (CN); Yiming Wang, Ningbo (CN); Qinglong Zhang, Ningbo (CN); Haisong Wu, Ningbo (CN); Jinyao Xu, Ningbo (CN)

(73) Assignee: NINGBO JINGHUA ELECTRONICS TECHNOLOGY CO., LTD., Ningbo (CN)

( * ) Notice: Subject to any disclaimer, the term of this patent is extended or adjusted under 35 U.S.C. 154(b) by 198 days.

(21) Appl. No.: 18/746,343

(22) Filed: Jun. 18, 2024

(65) Prior Publication Data

US 2024/0339908 A1 Oct. 10, 2024

(30) Foreign Application Priority Data

May 28, 2024 (CN) ........................ 202410670792.7

(51) Int. Cl.
*H02K 37/12* (2006.01)
*H02K 1/2706* (2022.01)
(Continued)

(52) U.S. Cl.
CPC ........... *H02K 37/12* (2013.01); *H02K 1/2706* (2013.01); *H02K 3/12* (2013.01); *H02K 5/225* (2013.01); *H02K 2203/09* (2013.01)

(58) Field of Classification Search
CPC ...... H02K 137/12; H02K 1/2706; H02K 3/12; H02K 5/225; H02K 2203/09; H02K 11/22;
(Continued)

(56) References Cited

U.S. PATENT DOCUMENTS 5,705,864 A * 1/1998 Takano .................... H02K 7/06 310/90
2002/0050751 A1 * 5/2002 Hashimoto .............. H02K 3/44 310/71
(Continued)

FOREIGN PATENT DOCUMENTS

CN 205792167 U * 12/2016

OTHER PUBLICATIONS

CN-205792167-U English Translation.*

*Primary Examiner* — Maged M Almawri
(74) *Attorney, Agent, or Firm* — Getech Law LLC; Jun Ye

(57) ABSTRACT

A stepping dimming motor structure is provided, including a shell, and further including: a winding frame, which is provided with a coil, wherein a wiring block is arranged on a side circumferential wall of the winding frame; two wiring slots are arranged on the wiring block; each wiring slot corresponds to a wiring tab; a magnetically-conductive ring frame. The above scheme generates a magnetic field by powering up the coil to excite the magnetically-conductive ring frame, thus driving the rotor assembly to rotate; the rotor assembly then drives the push rod to move axially, adjusting headlights; and meanwhile, a fastening effect on lead wire ends of the coil and electrical connection between the lead wire ends of the coil and the wiring tabs are achieved through plugging fit between the wiring tabs and the wiring slots, thereby ensuring the structural reliability and improving the assembling efficiency.

9 Claims, 13 Drawing Sheets

(51) Int. Cl.
*H02K 3/12* (2006.01)
*H02K 5/22* (2006.01)

(58) Field of Classification Search
CPC .. H02K 5/01; H02K 5/06; H02K 5/15; H02K 5/173; H02K 5/1735; H02K 5/1737; H02K 5/24; H02K 7/06; H02K 7/08; H02K 7/081; H02K 7/085; H02K 7/086; H02K 7/088; H02K 7/10; H02K 7/116; H02K 7/1166; H02K 7/1815; B60T 13/741; B60T 13/745
See application file for complete search history.

(56) References Cited

U.S. PATENT DOCUMENTS

2005/0046305 A1* 3/2005 Matsushita ............ H02K 1/145 310/257
2006/0055279 A1* 3/2006 Zhan ...................... H02K 37/14 310/257
2006/0261684 A1* 11/2006 Sonohara ............... H02K 3/525 310/49.08
2006/0284496 A1* 12/2006 Mizumaki .............. H02K 7/116 310/80
2009/0058233 A1* 3/2009 Yajima ................... H02K 1/145 310/49.32
2009/0152974 A1* 6/2009 Li .......................... H02K 1/145 310/179
2013/0221795 A1* 8/2013 Hata ........................ H02K 5/15 310/216.131
2013/0278086 A1* 10/2013 Furlan ...................... H02K 7/06 29/598
2014/0028128 A1* 1/2014 Yoshitomi .............. H02K 3/525 310/71
2014/0300219 A1* 10/2014 Yamamoto ........... H02K 7/1021 310/49.15
2015/0229195 A1* 8/2015 Sasaki .................... B60K 35/28 74/414
2016/0079838 A1* 3/2016 Yoda ...................... H02K 37/10 310/49.01
2018/0069462 A1* 3/2018 Maeda ..................... H02K 3/28
2021/0328467 A1* 10/2021 Tomiyama ............. H02K 1/187

* cited by examiner

STEPPING DIMMING MOTOR STRUCTURE WITH PUSH ROD AND WIRE BLOCK

TECHNICAL FIELD

The present disclosure relates to the technical field of motors, and in particular, to a stepping dimming motor structure.

BACKGROUND

As one of the important components of an automobile, headlights can provide an effective lighting function during nighttime driving, thereby ensuring that the driver has a good field of view of driving. For the sake of improving the lighting effect, some automobiles will have corresponding dimming motors on headlights to adjust irradiation directions or angles of the headlights.

Main structures of a dimming stepping motor include a push rod with a threaded section, a stator member with a coil, and a rotor member with a magnetic material. A lead wire end of the coil is connected to a circuit board of a socket by welding, so that when the circuit board powers up the coil, a corresponding magnetic field is generated in the stator member, which drives the rotor member to rotate. The rotor member is provided with an axial screw hole, and the threaded section of the push rod is screwed to the screw hole. A shell is provided with a sliding chute that restricts the push rod from rotating around its own axis, thereby driving the push rod to linearly move relative to the shell through the rotation of the rotor member. However, many components in the existing dimming stepping motor are assembled together by welding, such as the shell and stator member, and the lead wire end of the coil and the circuit board. The welding manner leads to low assembling efficiency. Furthermore, when welding points crack and the components fall off, the components can only be removed and welded again, so that the maintenance difficulty is high, and it is not conductive for environmental protection.

SUMMARY

The present disclosure aims to solve the problems that many components in a dimming stepping motor in the prior art are connected by welding, so that the assembling efficiency is low, and it is not conductive for subsequent maintenance.

To solve the above problems, the present disclosure provides a stepping dimming motor structure, including a shell, and further including:

a winding frame, which is provided with a circumferentially wound coil, wherein a wiring block is arranged on a side circumferential wall of the winding frame; two wiring slots are arranged on the wiring block; each wiring slot corresponds to a wiring tab; two lead wire ends of the coil are respectively threaded into the two wiring slots of the wiring block; one end of each wiring tab is a plugging end, and the other end is a wiring end; the plugging end is plugged into the corresponding wiring slot to achieve fastening and electrical connection of the lead wire end of the coil;

a magnetically-conductive ring frame, which is arranged in the winding frame and is configured to generate a corresponding magnetic field according to a power-up state of the coil;

a rotor assembly, which is rotatably arranged in the magnetically-conductive ring frame and is driven to rotate by the magnetic field generated by the magnetically-conductive ring frame, wherein the rotor assembly is provided with an axial screw hole; and a push rod, which includes a threaded section screwed into the screw hole and a displacement section provided with a limiting member, wherein the winding frame or the shell is provided with an axial sliding chute; and the limiting member is in sliding fit in the sliding chute to achieve circumferential limitation on the push rod, so that the push rod is driven to axially move through rotation of the rotor assembly.

During use of the above scheme, the coil is powered through the wiring tabs on the wiring block, and the magnetically-conductive ring frame is excited by changes in current of the coil to generate a changing magnetic field, thus driving the rotor assembly to rotate; the rotor assembly can drive the push rod to move axially because of movable screwing fit with the push rod; the overall structure is simple and compact, and the assembling is convenient; meanwhile, in the above scheme, by the arrangement of the two wiring slots on the wiring block, the plugging fit between the wiring tabs and the wiring slots can fasten the lead wire ends of the coil and achieve electrical connection between the lead wire ends of the coil and the wiring tabs. Compared with a welding method in the prior art, this method can ensure the structural reliability and improve the assembling efficiency.

As a preferred scheme, a through wire passing slot is provided on one side of each wiring slot close to the corresponding coil, and the wire passing slot extends to a notch position of the wiring slot; the plugging ends are two side-by-side plugging pins; a plugging slot is formed between the two plugging pins; and the two plugging pins are plugged into the wiring slots in an interference fit manner, so that the lead wire ends of the coil are clamped in the plugging slot between the two plugging pins. By the arrangement of the wire passing slots, it is convenient to thread the lead wire ends of the coil into the wiring slots from the notch positions of the wiring slots and then effectively fasten the lead wire ends through the plugging slot between the plugging pins.

As a preferred scheme, convex blocks are respectively arranged on sides, facing away from each other, of the two plugging pins, and widths of the convex blocks gradually decrease in a plugging direction of the wiring tabs; a width of a notch of the plugging slot gradually decreases in a direction close to a slot bottom; and a placement region for accommodating the lead wire ends of the coil is arranged at the slot bottom of the plugging slot. By the adoption of the above structure, as the wiring tabs are plugged into the wiring slots, the convex blocks will be closely abutted against slot walls of the wiring slots, so that on the one hand, the plugging tightness between the plugging ends of the wiring tabs and the wiring slots is ensured through the convex blocks to avoid separation; and on the other hand, the convex blocks can guide the two plugging pins to be close to each other to achieve better clamping on the lead wire ends of the coil. Moreover, since the width of the notch of the plugging slot gradually decreases in the direction close to the slot bottom, the lead wire ends of the coil will be in contact with the opposite sides of the two plugging pins when moving from the notch of the plugging slot towards the slot bottom, and insulating paint on surfaces of the lead wire ends will be rubbed off; and after the lead wire ends enter the placement region, the electrical connection to the plugging ends of the wiring tabs can be achieved.

As a preferred scheme, the rotor assembly is rotatably connected in the magnetically-conductive ring frame through a bearing; the rotor assembly includes a rotor sleeve and a magnetic ring; the screw hole is provided in the rotor sleeve and axially penetrates through the rotor sleeve; the magnetic ring is fixedly sleeved to the rotor sleeve; and a position of the magnetic ring corresponds to a position of the magnetically-conductive ring frame. Thus, the rotor assembly can rotate under the action of the magnetic field generated by the magnetically-conductive ring frame.

As a preferred scheme, two winding frames are arranged in the shell and are coaxially arranged in a front-back direction; the wiring blocks of the two winding frames are adjacent to each other; two magnetically-conductive ring frames are included and are coaxially arranged in the front-back direction; the two magnetically-conductive ring frames are respectively arranged in the two winding frames; two magnetic rings are included and are respectively sleeved to a front end and a rear end of the rotor sleeve; and the positions of the two magnetic rings respectively correspond to the positions of the two magnetically-conductive ring frames. Thus, a rotation angle of the rotor assembly is controlled more accurately.

As a preferred scheme, each magnetically-conductive ring frame includes an annular carrying disk and a plurality of pole pieces distributed in a circumferential direction of the carrying disk; the carrying disks of the two magnetically-conductive ring frames are connected to each other in an abutting manner; and positioning bulges and positioning holes which are complemented to each other are arranged on sides, opposite to each other, of the two carrying disks. Thus, precise assembling between the two magnetically-conductive ring frames is achieved.

As a preferred scheme, annular step slots connected to the magnetic rings are respectively provided at the front end and the rear end of the rotor sleeve; plugging keys are provided on inner circumferential walls of the magnetic rings; key slots which are in interference fit with the plugging keys are provided on the annular step slots to achieve circumferential fixing of the rotor sleeve and the magnetic rings; a raised clamping hook is arranged on one side of each annular step slot away from a middle portion of the rotor sleeve; and the clamping hooks resist against the magnetic rings to achieve axial fixing of the magnetic rings. Thus, this ensures the stability of connection between the rotor sleeve and the magnetic rings, avoids looseness and separation between the rotor sleeve and the magnetic rings, and the assembling is convenient.

As a preferred scheme, the stepping dimming motor structure further includes a socket; a mounting portion for allowing the socket to be plugged in a direction from front to back or a direction from back to front is arranged at a position, corresponding to the wiring block, at a middle portion of the shell; wiring ends of the four wiring tabs are distributed from left to right, and a distance between the wiring ends of the two wiring tabs located on the left side is equal to a distance between the wiring ends of the two wiring tabs located on the right side; and power supply pins corresponding to the wiring ends of the wiring tabs one by one are arranged in the socket. Thus, when the socket is plugged to the mounting portion in the direction from front to back or the direction from back to front, the power supply pins in the socket can be adapted to the wiring ends of the four wiring tabs, making it convenient for a user to freely select and use the power supply pins.

As a preferred scheme, magnetically-conductive rings are respectively arranged at a front portion and a rear portion of the shell; the magnetically-conductive ring frames and the magnetically-conductive rings are both provided with pole pieces which are circumferentially distributed; the pole pieces of the magnetically-conductive ring at the front portion of the shell are staggered from the pole pieces of the magnetically-conductive ring frame located on the front side; and the pole pieces of the magnetically-conductive ring at the rear portion of the shell are staggered from the pole pieces of the magnetically-conductive ring frame located on the rear side. Thus, after the coil is powered up, the magnetically-conductive ring frames and the magnetically-conductive rings can generate a strong magnetic field in the shell.

As a preferred scheme, an end portion of the displacement section of the push rod extends out of a front side of the shell; a plurality of buckles which are circumferentially distributed are arranged on a front end surface of the shell; a housing is arranged on the front side of the shell; the housing is provided with a plurality of elongated holes which are circumferentially distributed; and the buckles are configured to be twisted to deform after passing through the elongated holes, so that the housing is fixed on the front side of the shell. The housing is configured to support and protect the displacement section of the push rod.

DESCRIPTIONS OF REFERENCE NUMERALS

Figure 1:
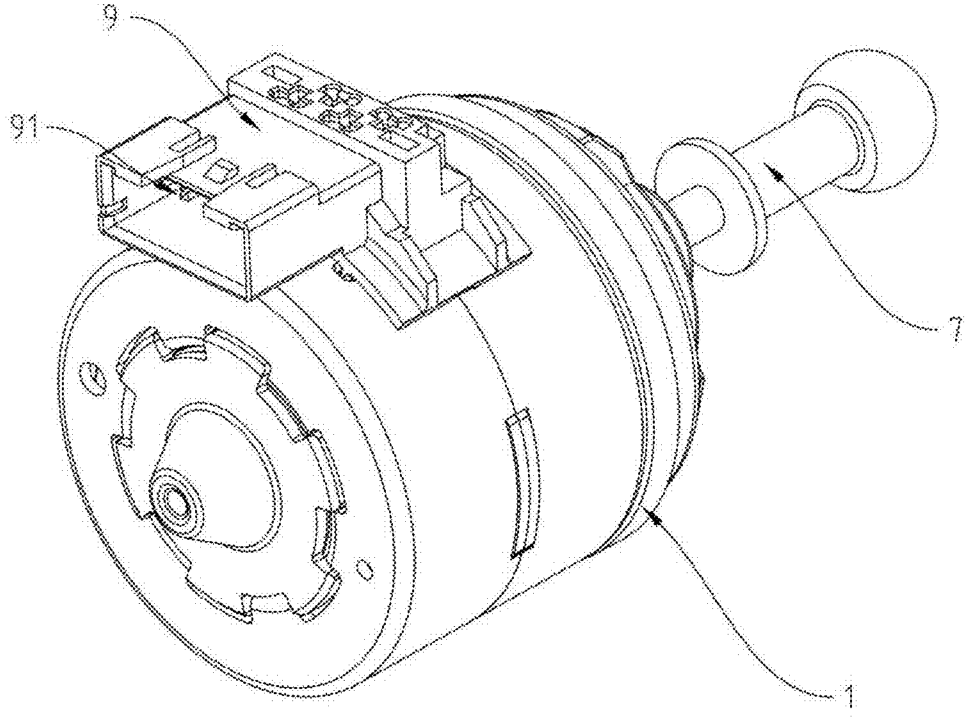
FIG. 1 is an overall schematic diagram of a stepping dimming motor structure.
Figure 2:
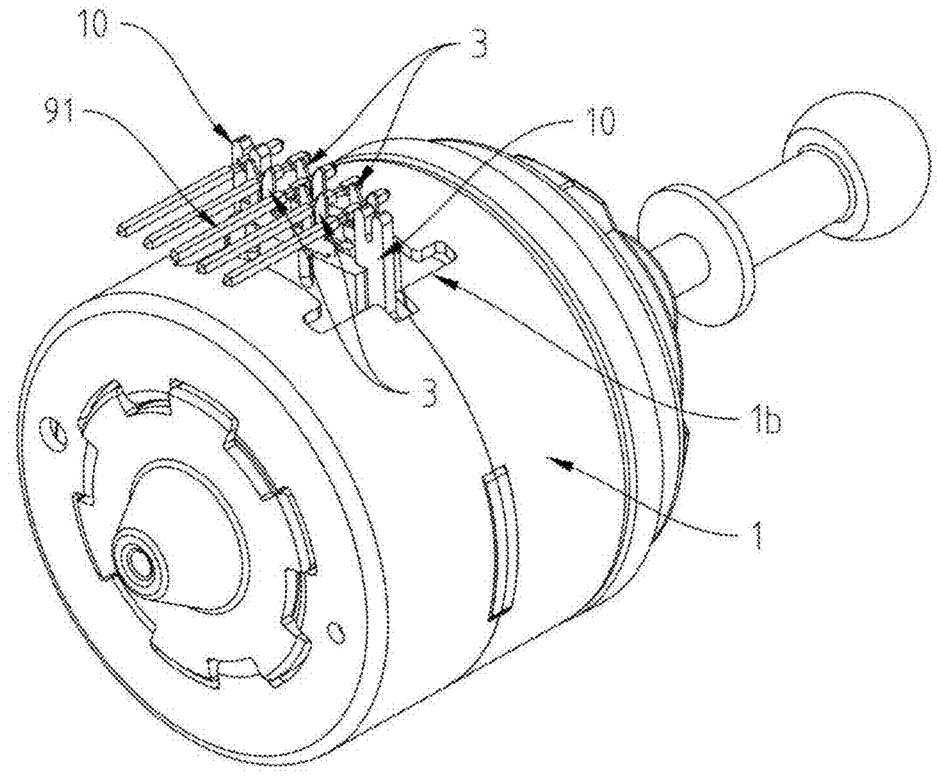
FIG. 2 is a schematic diagram of cooperation between power supply pins and wiring ends of a stepping dimming motor structure.

1: shell; 1*a*: buckle; 1*b*: mounting portion; 11: housing; 11*a*: elongated hole; 2: winding frame; 21: wiring block; 22: wiring slot; 23: sliding chute; 24: wire passing slot; 3: wiring tab; 31: plugging pin; 31*a*: plugging slot; 31*b*: placement region; 31*c*: convex block; 32: wiring pin; 4: coil; 51: magnetically-conductive ring frame; 511: carrying disk; 512: positioning bulge; 513: positioning hole; 52: magnetically-conductive ring; 53: pole piece; 6: rotor assembly; 61: rotor sleeve; 61*a*: screw hole; 61*b*: key slot; 61*c*: annular step slot; 61*d*: clamping hook; 62: magnetic ring; 62*a*: plugging slot; 7: push rod; 7*a*: threaded section; 7*b*: displacement section; 71: limiting member; 8: bearing; 9: socket; 91: power supply pin; and 10: grounding tab.

DETAILED DESCRIPTION OF THE EMBODIMENTS

To make the objectives, features, and advantages of the present disclosure more obvious and understandable, the technical solutions in the embodiments of the present disclosure will be clearly and completely described below with reference to the drawings in the embodiments of the present disclosure, and it is obvious that the embodiments described below are only a part of the embodiments of the present disclosure but not all of them. All other embodiments obtained by a person of ordinary skill in the art based on the embodiments of present disclosure without making creative efforts shall fall within the protection scope of present disclosure. It should be noted that all directional indications (such as up, down, left, right, front, back, inner, and outer) involved in the embodiments of the present disclosure are only used to explain the relative positional relationship, motion states, and the like between various components in specific postures (as shown in the accompanying drawings). If the specific postures change, the directional indications also change correspondingly.

Referring to FIG. 1 to FIG. 13, a stepping dimming motor structure provided by an embodiment of the present disclosure includes a shell 1, and further includes the following components located in the shell 1:

a winding frame 2, which is annular and is provided with a circumferentially wound coil 4, wherein a wiring block 21 is arranged on a side circumferential wall of the winding frame 2; two wiring slots 22 are arranged on the wiring block 21; each wiring slot 22 corresponds to a wiring tab 3; two lead wire ends of the coil 4 are respectively threaded into the two wiring slots 22 of the wiring block 21; one end of each wiring tab 3 is a plugging end, and the other end is a wiring end; the plugging end is plugged into the corresponding wiring slot 22 to achieve fastening and electrical connection of the lead wire end of the coil 4;

a magnetically-conductive ring frame 51, which is arranged in the winding frame 2 and is configured to generate a corresponding magnetic field according to a power-up state of the coil 4;

a rotor assembly 6, which is rotatably arranged in the magnetically-conductive ring frame 51 and is driven to rotate by the magnetic field generated by the magnetically-conductive ring frame 51, wherein the rotor assembly 6 is provided with an axial screw hole 61*a*; and a push rod 7, which includes a threaded section 7*a* screwed into the screw hole 61*a* and a displacement section 7*b* provided with a limiting member 71, wherein the winding frame 2 or the shell 1 is provided with an axial sliding chute 23; and the limiting member 71 is in sliding fit in the sliding chute 23 to achieve circumferential limitation on the push rod 7, so that the push rod 7 is driven to axially move through rotation of the rotor assembly 6.

During use of the above scheme, the coil 4 is powered through the wiring tabs 3 on the wiring block 21, and the magnetically-conductive ring frame 51 is excited by changes in current of the coil 4 to generate a changing magnetic field, thus driving the rotor assembly 6 to rotate; the rotor assembly 6 can drive the push rod 7 to move axially because of movable screwing fit with the push rod 7; the overall structure is simple and compact, and the assembling is convenient; meanwhile, in the above scheme, by the arrangement of the two wiring slots 22 on the wiring block 21, the plugging fit between the wiring tabs 3 and the wiring slots 22 can fasten the lead wire ends of the coil 4 and achieve electrical connection between the lead wire ends of the coil 4 and the wiring tabs 3. Compared with a welding method in the prior art, this method can ensure the structural reliability and improve the assembling efficiency.

To achieve a clearer explanation, based on FIG. 1, an axial line of the shell 1 is arranged in the front-back direction. In an embodiment, only one winding frame 2 can be arranged in the shell 1, and only one corresponding magnetically-conductive ring frame 51 is included. Refer to the prior art from a main body structure of the magnetically-conductive ring frame 51. Specifically, the main body structure of the magnetically-conductive ring frame 51 includes an annular carrying disk 511 and a plurality of pole pieces 53 distributed in a circumferential direction of the carrying disk 511. After the coil 4 is powered up, the pole pieces 53 of the corresponding magnetically-conductive ring frame 51 can form a magnetic field inside the magnetically-conductive ring frame 51 to drive the rotor assembly 6 to rotate.

Figure 4:
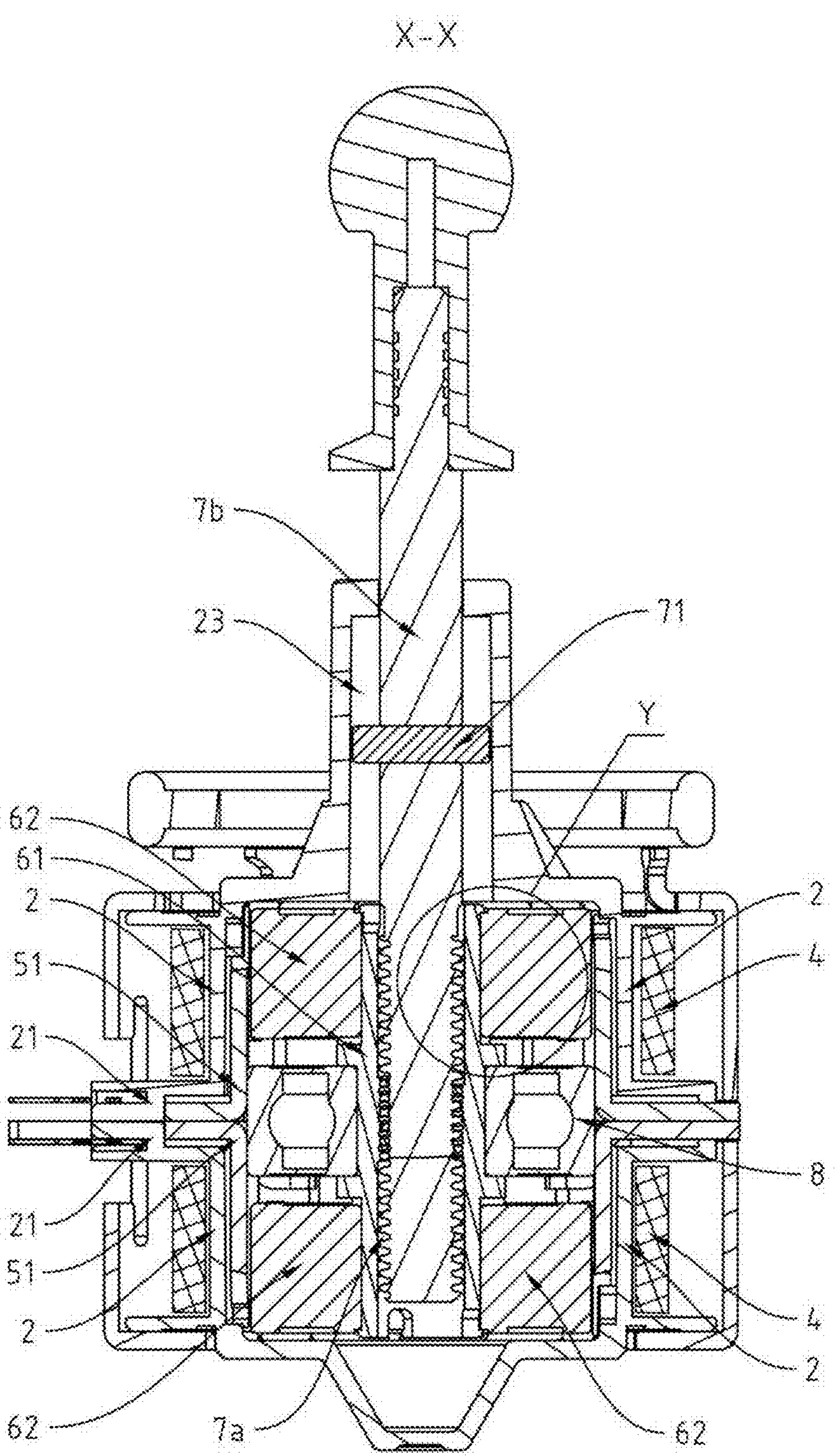
FIG. 4 is a schematic cross-sectional view along an X-X section line in FIG. 3.
Figure 5:
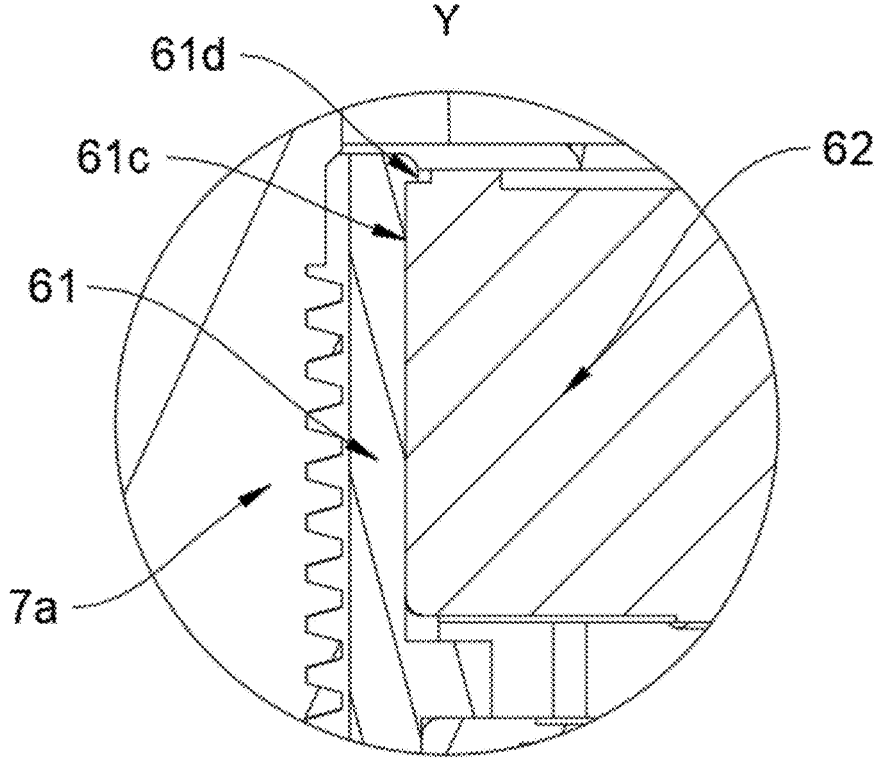
FIG. 5 is a partially enlarged view of region Y in FIG. 4.
Figure 9:
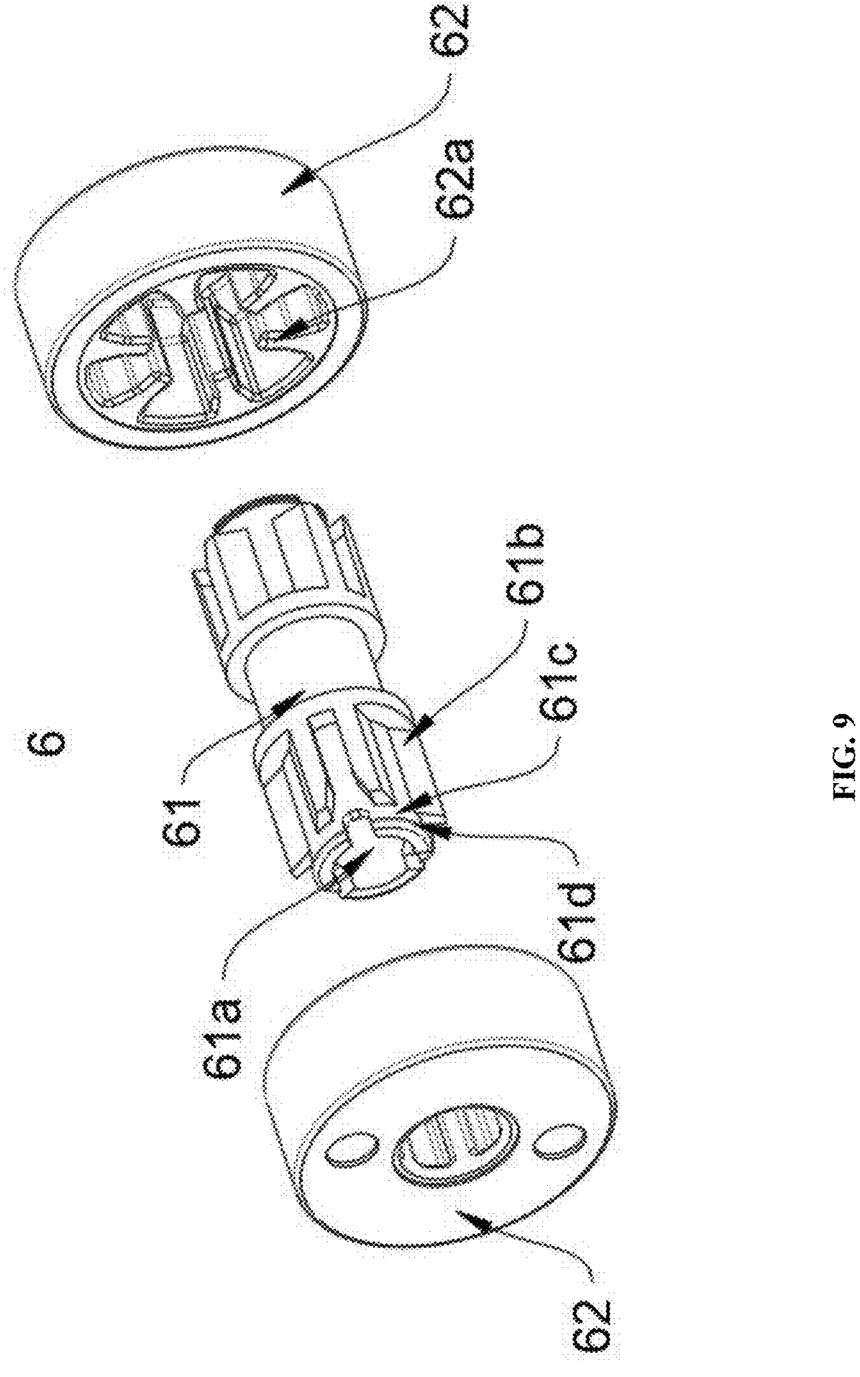
FIG. 9 is a schematic structural diagram of a rotor assembly of a stepping dimming motor structure.

As shown in FIG. 4 and FIG. 9, the rotor assembly 6 is rotatably connected in the magnetically-conductive ring frame 51 through a bearing 8; the rotor assembly 6 includes a rotor sleeve 61 and a magnetic ring 62; the screw hole 61*a* is provided in a center of the rotor sleeve 61 and axially penetrates through the rotor sleeve; the magnetic ring 62 is fixedly sleeved to the rotor sleeve 61; and a position of the magnetic ring 62 corresponds to a position of the magnetically-conductive ring frame 51. Thus, the rotor assembly 6 can rotate under the action of the magnetic field generated by the magnetically-conductive ring frame 51. To improve the stability of connection between the rotor sleeve 61 and the magnetic ring 62, annular step slots 61*c* connected to the magnetic ring 62 are respectively provided at the front end and the rear end of the rotor sleeve 61; plugging keys 62*a* are provided on an inner circumferential wall of the magnetic ring 62; key slots 61*b* which are in interference fit with the plugging keys 62*a* are provided on the annular step slots 61*c* to achieve circumferential fixing of the rotor sleeve 61 and the magnetic ring 62; a raised clamping hook 61*d* is arranged on one side of each annular step slot 61*c* away from a middle portion of the rotor sleeve 61; and the clamping hooks 61*d* resist against the magnetic ring 62 to achieve axial fixing of the magnetic ring 62. Thus, this ensures the stability of connection between the rotor sleeve 61 and the magnetic ring 62, avoids looseness and separation between the rotor sleeve 61 and the magnetic ring 62, and the assembling is convenient.

To achieve more accurately control on a rotation angle of the rotor assembly 6, in this embodiment, two winding frames 2 are arranged in the shell 1 and are coaxially arranged in a front-back direction; the wiring blocks 21 of the two winding frames 2 are adjacent to each other; two magnetically-conductive ring frames 51 are included and are coaxially arranged in the front-back direction; the two magnetically-conductive ring frames 51 are respectively arranged in the two winding frames 2; two magnetic rings 62 are included and are respectively sleeved to a front end and a rear end of the rotor sleeve 61; and the positions of the two magnetic rings 62 respectively correspond to the positions of the two magnetically-conductive ring frames 51. By powering up the coil 4 on the two winding frames 2, the two magnetically-conductive ring frames 51 can generate magnetic fields respectively. Thus, the rotation angle of the rotor assembly 6 is controlled more accurately.

Figure 8:
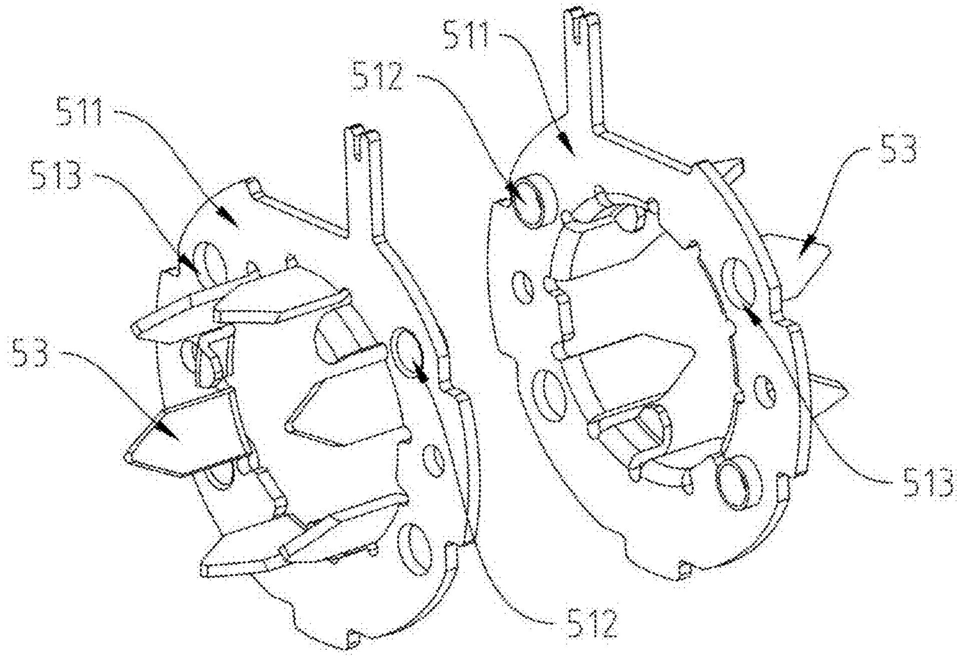
FIG. 8 is a schematic structural diagram of two magnetically-conductive ring frames of a stepping dimming motor structure.

In this embodiment, the carrying disks 511 of the two magnetically-conductive ring frames 51 are connected in an abutting manner, and positioning bulges 512 and positioning holes 513 which are complemented to each other are arranged on sides, opposite to each other, of the two carrying disks 511. As shown in FIG. 8, backward positioning bulges 512 are arranged at an upper left position and a lower right position of the carrying disk 511 located on the front side, and positioning holes 513 are provided at a lower left position and an upper right position; and positioning holes 513 are provided at an upper left position and a lower right position of the carrying disk 511 located on the rear side, and forward positioning bulges 512 are arranged at a lower left position and an upper right position, thus achieving precise assembling between the two magnetically-conductive ring frames 51.

Figure 12:
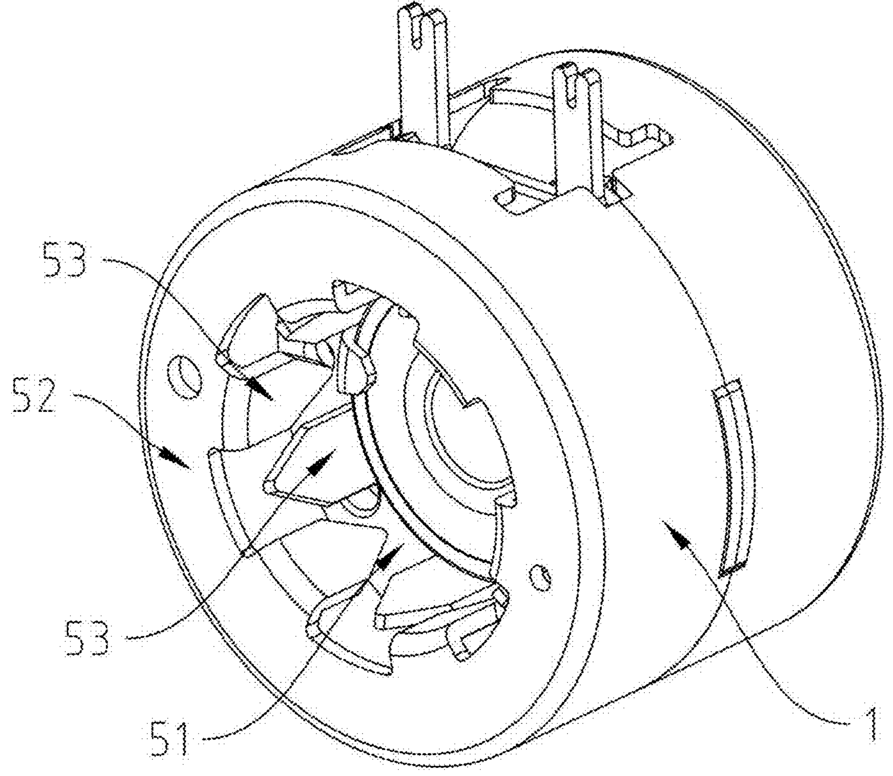
FIG. 12 is a schematic diagram a (corresponding to a rear portion of the shell) of magnetically-conductive rings and magnetically-conductive ring frames of a stepping dimming motor structure.
Figure 13:
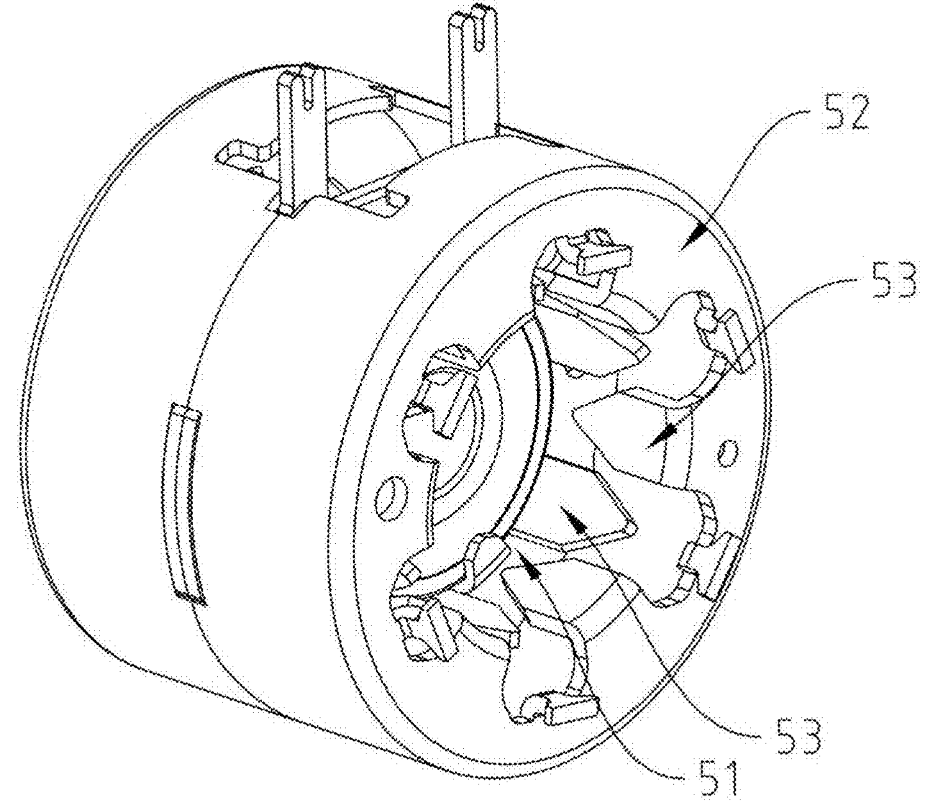
FIG. 13 is a schematic diagram b (corresponding to a front portion of the shell) of magnetically-conductive rings and magnetically-conductive ring frames of a stepping dimming motor structure.

As shown in FIG. 12 and FIG. 13, as an improvement on this embodiment, magnetically-conductive rings 52 are respectively arranged at a front portion and a rear portion of the shell 1; the magnetically-conductive rings 52 are provided with pole pieces 53 which are circumferentially distributed; meanwhile, as mentioned above, the magnetically-conductive ring frames 51 are further provided with pole pieces 53 which are circumferentially distributed; the pole pieces 53 of the magnetically-conductive ring 52 at the front portion of the shell 1 are staggered from the pole pieces 53 of the magnetically-conductive ring frame 51 located on the front side; and the pole pieces 53 of the magnetically-conductive ring 52 at the rear portion of the shell 1 are staggered from the pole pieces 53 of the magnetically-conductive ring frame 51 located on the rear side. Thus, after the coil is powered on, the magnetically-conductive ring frames 51 and the magnetically-conductive rings 52 can generate a strong magnetic field in the shell 1.

As an extension of this embodiment, the above scheme further includes a socket 9; a mounting portion 1*b* for allowing the socket 9 to be plugged in a direction from front to back or a direction from back to front is arranged at a position, corresponding to the wiring block 21, at a middle portion of the shell 1; wiring ends of the four wiring tabs 3 are two side-by-side wiring pins 32; the wiring ends of the four wiring tabs 3 are distributed from left to right, and a distance between the wiring ends of the two wiring tabs 3 located on the left side is equal to a distance between the wiring ends of the two wiring tabs 3 located on the right side; and power supply pins 91 corresponding to the wiring ends of the wiring tabs 3 one by one are arranged in the socket 9. The power supply pins 91 are configured to be plugged between the two wiring pins 32 of the wiring ends of the wiring tabs 3 to achieve electrical connection. When the socket 9 is plugged to the mounting portion 1*b* in the direction from front to back or the direction from back to front, the power supply pins 91 in the socket 9 can be adapted to the wiring ends of the four wiring tabs 3, making it convenient for a user to freely select and use the power supply pins. In addition, a grounding tab 10 is arranged on a left side of the wiring block 21 of the winding frame 2 located on the front side, and a grounding tab 10 is arranged on a right side of the wiring block 21 of the winding frame 2 located on the rear side. The socket 9 is provided with grounding pins corresponding to the grounding tabs 10.

Figure 3:
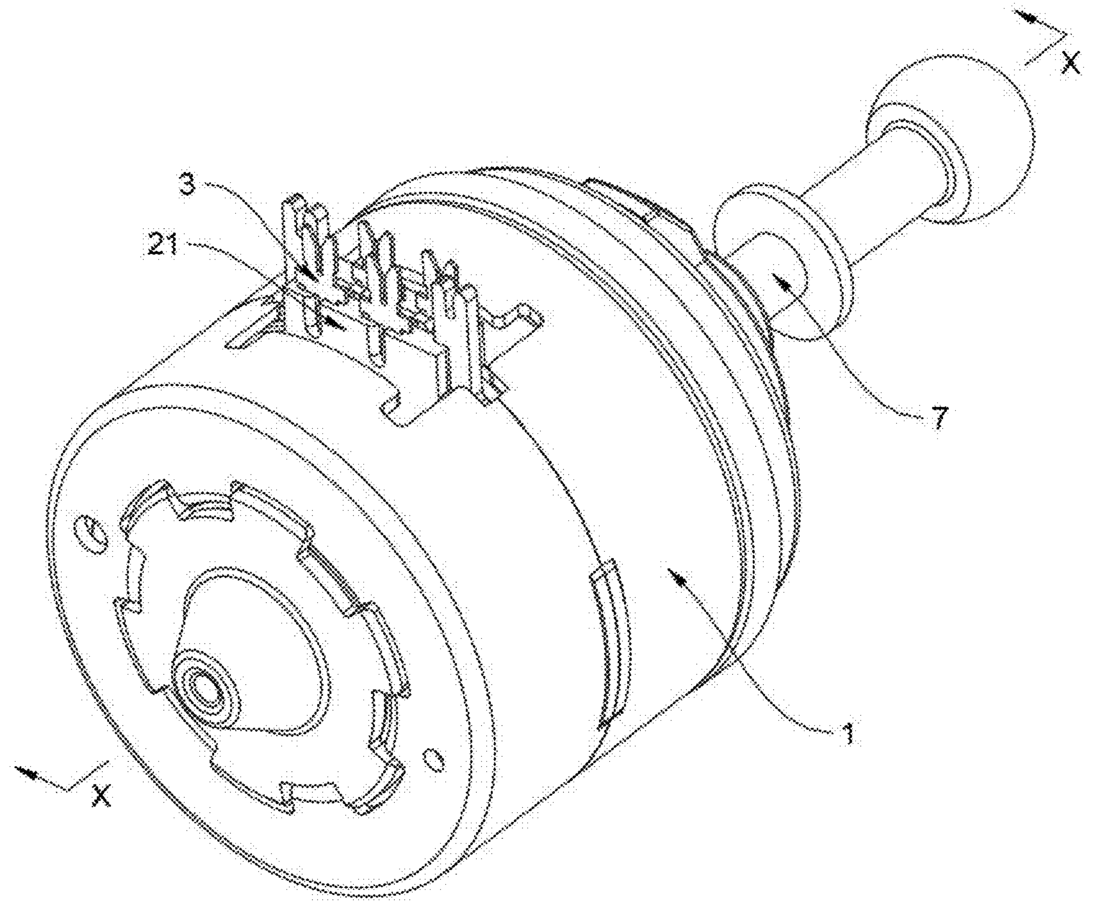
FIG. 3 is a schematic diagram of hiding a socket of a stepping dimming motor structure.
Figure 6:
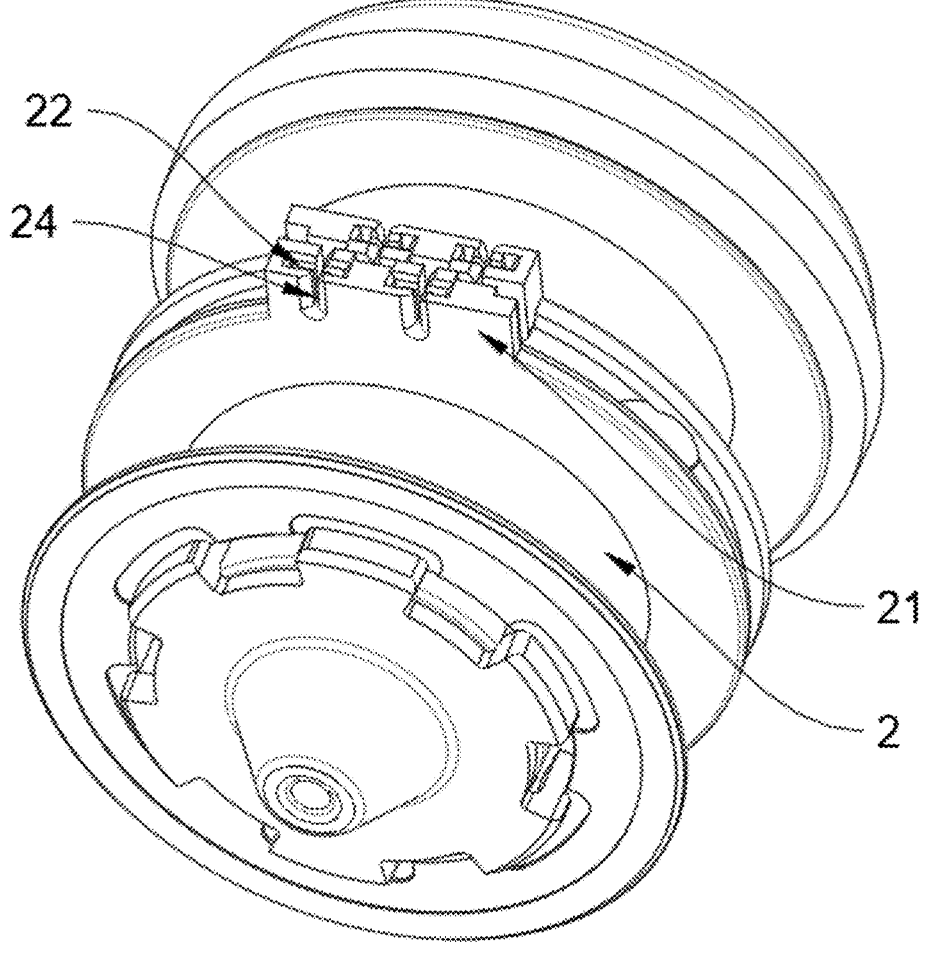
FIG. 6 is a schematic structural diagram of two winding frames of a stepping dimming motor structure.

As shown in FIG. 3 and FIG. 6, the wiring block 21 in this embodiment is located at an upper portion of a side circumferential wall of the winding frame 2, and the two wiring slots 22 are provided at a left portion and a right portion of an upper end surface of the wiring block 21. As an improvement on the wiring block 21, a through wire passing slot 24 is provided on one side of each wiring slot 22 close to the corresponding coil 4, and the wire passing slot 24 extends upwards to a notch position of the wiring slot 22; the plugging ends of the wiring tabs 3 are two side-by-side plugging pins 31; a plugging slot 31*a* is formed between the two plugging pins 31; and the two plugging pins 31 are plugged into the wiring slots 22 in an interference fit manner, so that the lead wire ends of the coil 4 are clamped in the plugging slot 31*a* between the two plugging pins 31. By the arrangement of the wire passing slots 24, it is convenient to thread the lead wire ends of the coil 4 into the wiring slots 22 from the notch positions of the wiring slots 22 and then effectively fasten the lead wire ends through the plugging slot 31*a* of the wiring tabs 3.

Figure 7:
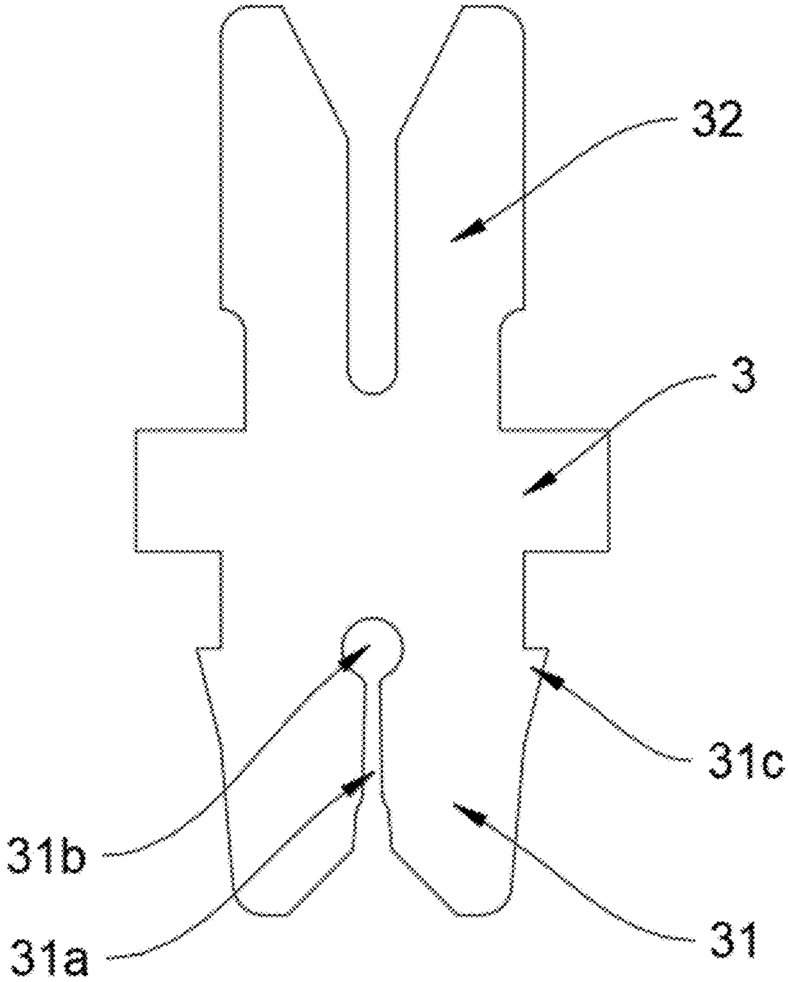
FIG. 7 is a schematic structural diagram of wiring tabs of a stepping dimming motor structure.

As shown in FIG. 7. further, convex blocks 31*c* are respectively arranged on sides, facing away from each other, of the two plugging pins 31, and widths of the convex blocks 31*c* gradually decrease in a plugging direction of the wiring tabs 3; a width of a notch of the plugging slot 31*a* gradually decreases in a direction close to a slot bottom; and a placement region 31*b* for accommodating the lead wire ends of the coil 4 is arranged at the slot bottom of the plugging slot 31*a*. By the adoption of the above structure, as the wiring tabs 3 are plugged into the wiring slots 22, the convex blocks 31*c* will be closely abutted against slot walls of the wiring slots 22, so that on the one hand, the plugging tightness between the plugging ends of the wiring tabs 3 and the wiring slots 22 is ensured through the convex blocks 31*c* to avoid separation; and on the other hand, the convex blocks 31*c* can guide the two plugging pins 31 to be close to each other to achieve better clamping on the lead wire ends of the coil 4. Moreover, since the width of the notch of the plugging slot 31*a* gradually decreases in the direction close to the slot bottom, the lead wire ends of the coil 4 will be in contact with the opposite sides of the two plugging pins 31 when moving from the notch of the plugging slot 31*a* towards the slot bottom, and insulating paint on surfaces of the lead wire ends will be rubbed off, and after the lead wire ends enter the placement region 31*b*, the electrical connection to the plugging ends of the wiring tabs 3 can be achieved.

Figure 10:
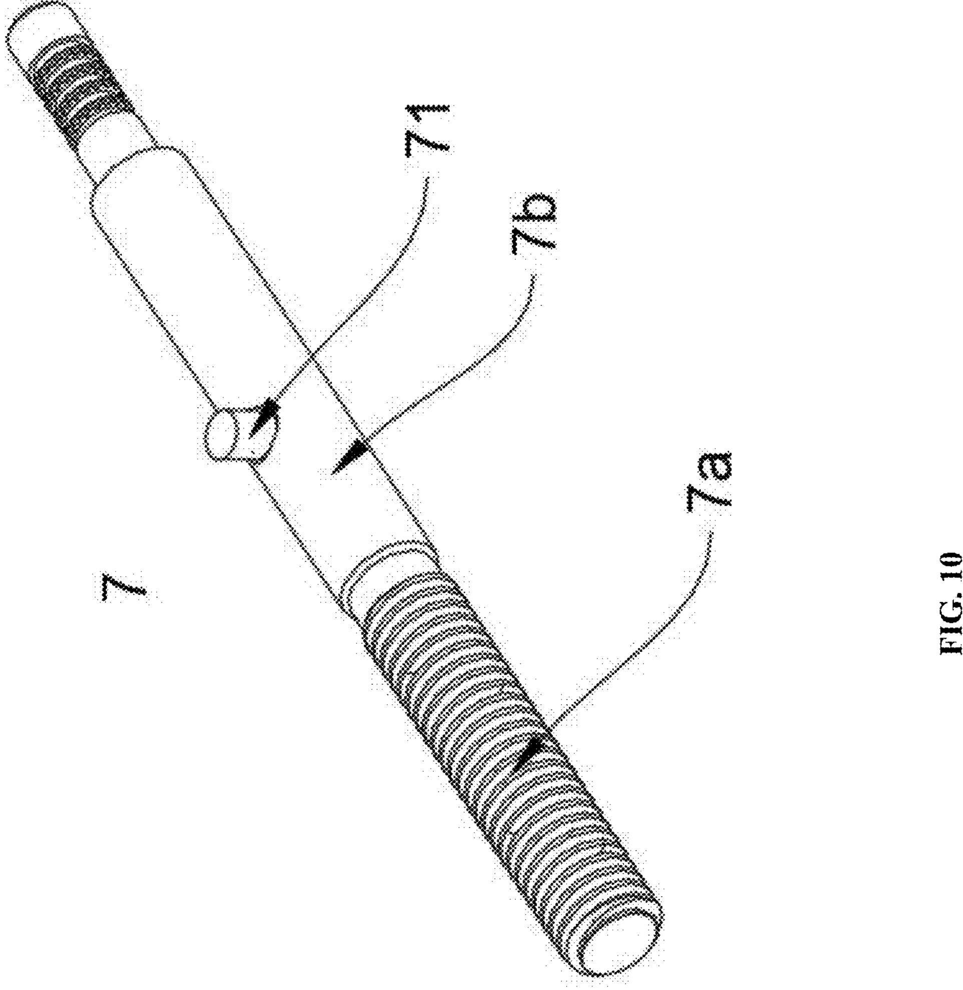
FIG. 10 is a schematic structural diagram of a push rod of a stepping dimming motor structure.

As shown in FIG. 10, in this embodiment, the limiting member 71 is a cylindrical pin; an axial line of the cylindrical pin is perpendicular to an axial line of the push rod 7, so that the cylindrical pin and the sliding chute 23 are in linear contact, thereby lowering the risk of locking the push rod 7. The structure is simple and reliable.

Figure 11:
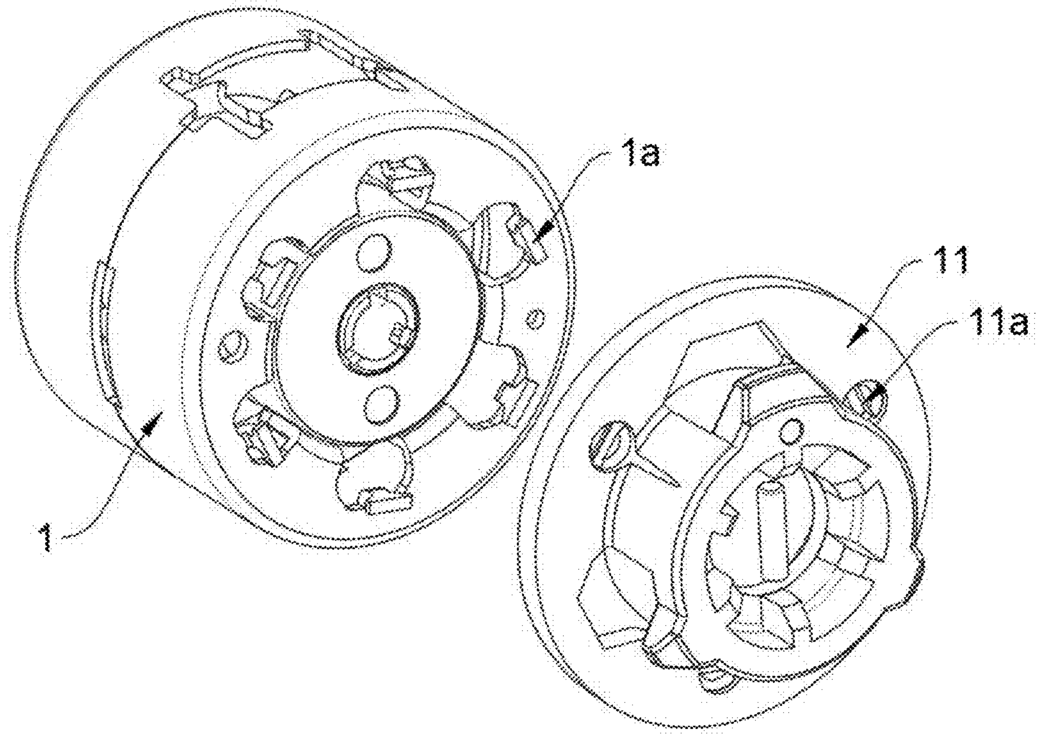
FIG. 11 is a schematic structural diagram of a housing and a shell of a stepping dimming motor structure.

As shown in FIG. 11, in this embodiment, an end portion of the displacement section 7*b* of the push rod 7 extends out of a front side of the shell 1; a plurality of buckles 1*a* which are circumferentially distributed are arranged on a front end surface of the shell 1; a housing 11 is arranged on the front side of the shell 1; the housing 11 is provided with a plurality of elongated holes 11*a* which are circumferentially distributed; and the buckles 1*a* are configured to be twisted to deform after passing through the elongated holes 11*a*, so that the housing 11 is fixed on the front side of the shell 1. The housing 11 is configured to support and protect the displacement section 7*b* of the push rod 7.

Although the present disclosure is as described above, the scope of protection of the present disclosure is not limited to this. For those skilled in the art, various changes and modifications can be made without departing from the spirit and scope of the present disclosure, all of which shall fall within the scope of protection of the present disclosure.

What is claimed is:

1. A stepping dimming motor structure, comprising a shell (1), wherein the shell (1) is internally provided with:

a winding frame (2), which is provided with a circumferentially wound coil (4), wherein a wiring block (21) is arranged on a side circumferential wall of the winding frame (2); two wiring slots (22) are arranged on the wiring block (21); each wiring slot (22) corresponds to a wiring tab (3); two lead wire ends of the coil (4) are respectively threaded into the two wiring slots (22) of the wiring block (21); one end of each wiring tab (3) is a plugging end, and the other end is a wiring end; the plugging end is plugged into the corresponding wiring slot (22) to achieve fastening and electrical connection of the lead wire end of the coil (4);

a magnetically-conductive ring frame (51), which is arranged in the winding frame (2) and is configured to generate a corresponding magnetic field according to a power-up state of the coil (4);

a rotor assembly (6), which is rotatably arranged in the magnetically-conductive ring frame (51) and is driven to rotate by the magnetic field generated by the magnetically-conductive ring frame (51), wherein the rotor assembly (6) is provided with an axial screw hole (61*a*); and a push rod (7), which comprises a threaded section (7*a*) screwed into the screw hole (61*a*) and a displacement section (7*b*) provided with a limiting member (71), wherein the winding frame (2) or the shell (1) is provided with an axial sliding chute (23); and the limiting member (71) is in sliding fit in the sliding chute (23) to achieve circumferential limitation on the push rod (7), so that the push rod (7) is driven to axially move through rotation of the rotor assembly (6), wherein a through wire passing slot (24) is provided on one side of each wiring slot (22) close to the corresponding coil (4), and the wire passing slot (24) extends to a notch position of the wiring slot (22); the plugging ends are two side-by-side plugging pins (31); a plugging slot (31*a*) is formed between the two plugging pins (31); and the two plugging pins (31) are plugged into the wiring slots (22) in an interference fit manner, so that the lead wire ends of the coil (4) are clamped in the plugging slot (31*a*) between the two plugging pins (31).

2. The stepping dimming motor structure according to claim 1, wherein convex blocks (31*c*) are respectively arranged on sides, facing away from each other, of the two plugging pins (31), and widths of the convex blocks (31*c*) gradually decrease in a plugging direction of the wiring tabs (3); a width of a notch of the plugging slot (31*a*) gradually decreases in a direction close to a slot bottom; and a placement region (31*b*) for accommodating the lead wire ends of the coil (4) is arranged at the slot bottom of the plugging slot (31*a*).

3. The stepping dimming motor structure according to claim 1, wherein an end portion of the displacement section (7*b*) of the push rod (7) extends out of a front side of the shell (1); a plurality of buckles (la) which are circumferentially distributed are arranged on a front end surface of the shell (1); a housing (11) is arranged on the front side of the shell (1); the housing (11) is provided with a plurality of elongated holes (11*a*) which are circumferentially distributed; and the buckles (la) are configured to be twisted to deform after passing through the elongated holes (11*a*), so that the housing (11) is fixed on the front side of the shell (1).

4. The stepping dimming motor structure according to claim 1, wherein the rotor assembly (6) is rotatably connected in the magnetically-conductive ring frame (51) through a bearing (8); the rotor assembly (6) comprises a rotor sleeve (61) and a magnetic ring (62); the screw hole (61*a*) is provided in the rotor sleeve (61) and axially penetrates through the rotor sleeve; the magnetic ring (62) is fixedly sleeved to the rotor sleeve (61); and a position of the magnetic ring (62) corresponds to a position of the magnetically-conductive ring frame (51).

5. The stepping dimming motor structure according to claim 4, wherein two winding frames (2) are arranged in the shell (1) and are coaxially arranged in a front-back direction; the wiring blocks (21) of the two winding frames (2) are adjacent to each other; two magnetically-conductive ring frames (51) are comprised and are coaxially arranged in the front-back direction; the two magnetically-conductive ring frames (51) are respectively arranged in the two winding frames (2); two magnetic rings (62) are comprised and are respectively sleeved to a front end and a rear end of the rotor sleeve (61); and the positions of the two magnetic rings (62) respectively correspond to the positions of the two magnetically-conductive ring frames (51).

6. The stepping dimming motor structure according to claim 5, wherein each magnetically-conductive ring frame (51) comprises an annular carrying disk (511) and a plurality of pole pieces (53) distributed in a circumferential direction of the carrying disk (511); the carrying disks (511) of the two magnetically-conductive ring frames (51) are connected to each other in an abutting manner; and positioning bulges (512) and positioning holes (513) which are complemented to each other are arranged on sides, opposite to each other, of the two carrying disks (511).

7. The stepping dimming motor structure according to claim 5, wherein annular step slots (61*c*) connected to the magnetic rings (62) are respectively provided at the front end and the rear end of the rotor sleeve (61); plugging keys (62*a*) are provided on inner circumferential walls of the magnetic rings (62); key slots (61*b*) which are in interference fit with the plugging keys (62*a*) are provided on the annular step slots (61*c*) to achieve circumferential fixing of the rotor sleeve (61) and the magnetic rings (62); a raised clamping hook (61*d*) is arranged on one side of each annular step slot (61*c*) away from a middle portion of the rotor sleeve (61); and the clamping hooks (61*d*) resist against the magnetic rings (62) to achieve axial fixing of the magnetic rings (62).

8. The stepping dimming motor structure according to claim 5, further comprising a socket (9), wherein a mounting portion (1*b*) for allowing the socket (9) to be plugged in a direction from front to back or a direction from back to front is arranged at a position, corresponding to the wiring block (21), at a middle portion of the shell (1); wiring ends of the four wiring tabs (3) are distributed from left to right, and a distance between the wiring ends of the two wiring tabs (3) located on the left side is equal to a distance between the wiring ends of the two wiring tabs (3) located on the right side; and power supply pins (91) corresponding to the wiring ends of the wiring tabs (3) one by one are arranged in the socket (9).

9. The stepping dimming motor structure according to claim 5, wherein magnetically-conductive rings (52) are respectively arranged at a front portion and a rear portion of the shell (1); the magnetically-conductive ring frame (51)

and the magnetically-conductive rings (52) are provided with pole pieces (53) which are circumferentially distributed; the pole pieces (53) of the magnetically-conductive ring (52) at the front portion of the shell (1) are staggered from the pole pieces (53) of the magnetically-conductive ring frame (51) located on the front side; and the pole pieces (53) of the magnetically-conductive ring (52) at the rear portion of the shell (1) are staggered from the pole pieces (53) of the magnetically-conductive ring frame (51) located on the rear side.

* * * * *